United States Patent
Brew

(10) Patent No.: US 9,751,482 B1
(45) Date of Patent: Sep. 5, 2017

(54) MAGNETIC VEHICLE TIRE PROTECTOR

(71) Applicant: Kek Brew, Altamonte Springs, FL (US)

(72) Inventor: Kek Brew, Altamonte Springs, FL (US)

( * ) Notice: Subject to any disclaimer, the term of this patent is extended or adjusted under 35 U.S.C. 154(b) by 0 days.

(21) Appl. No.: 15/254,970

(22) Filed: Sep. 1, 2016

(51) Int. Cl.
*B60R 19/54* (2006.01)

(52) U.S. Cl.
CPC .................... *B60R 19/54* (2013.01)

(58) Field of Classification Search
CPC ............... B60R 19/54; B60R 19/002
See application file for complete search history.

(56) References Cited

U.S. PATENT DOCUMENTS

| | | | |
|---|---|---|---|
| 1,178,680 A | 4/1916 | Rosenthal | |
| 1,759,687 A * | 5/1930 | Carter | B60R 19/54 15/339 |
| 2,759,604 A | 8/1956 | Carpenter | |
| 3,956,111 A * | 5/1976 | Manfredi | B03C 1/06 209/215 |
| 4,903,856 A | 2/1990 | Watts | |
| 5,413,225 A * | 5/1995 | Shields | A47L 11/22 209/215 |
| 5,481,983 A * | 1/1996 | Guzman | B03C 1/30 104/279 |
| 5,975,572 A * | 11/1999 | Benoit | B60R 19/00 280/768 |
| 6,113,164 A * | 9/2000 | Setina | B60R 19/54 293/115 |
| 6,263,996 B1 * | 7/2001 | Welch | B60R 19/00 180/271 |
| D527,858 S | 9/2006 | Van Cleave et al. | |
| 8,602,466 B2 * | 12/2013 | Barron | B60R 21/34 293/58 |
| 8,764,078 B1 * | 7/2014 | Lemonides | B60R 13/105 293/107 |
| 9,598,117 B1 * | 3/2017 | Hilburn | B62D 25/182 |

* cited by examiner

*Primary Examiner* — Erez Gurari
(74) *Attorney, Agent, or Firm* — Stevenson IP, LLC

(57) ABSTRACT

A magnetic vehicle tire protector, for picking up magnetically attractable road hazard elements, by including a substantially parallelepiped magnetic body attached to a vehicle underside in front of each tire. A bottom side of each magnetic body has a width at least approximately equal to a width of a treaded surface of the tire. A substantially parallelepiped bracket, disposed on a top side of each magnetic body, has parallel internal and external sections and a parallelepiped center section therebetween at a 45-degree angle relative the internal section. The internal section is more proximal the top side than the internal section. The center and external sections extend outwardly from the internal section and the top side. Fasteners on the internal section permanently affix the bracket to the top side. Round apertures on the external section receive fastening elements to affix the respective bracket and magnetic body to the vehicle underside.

3 Claims, 3 Drawing Sheets

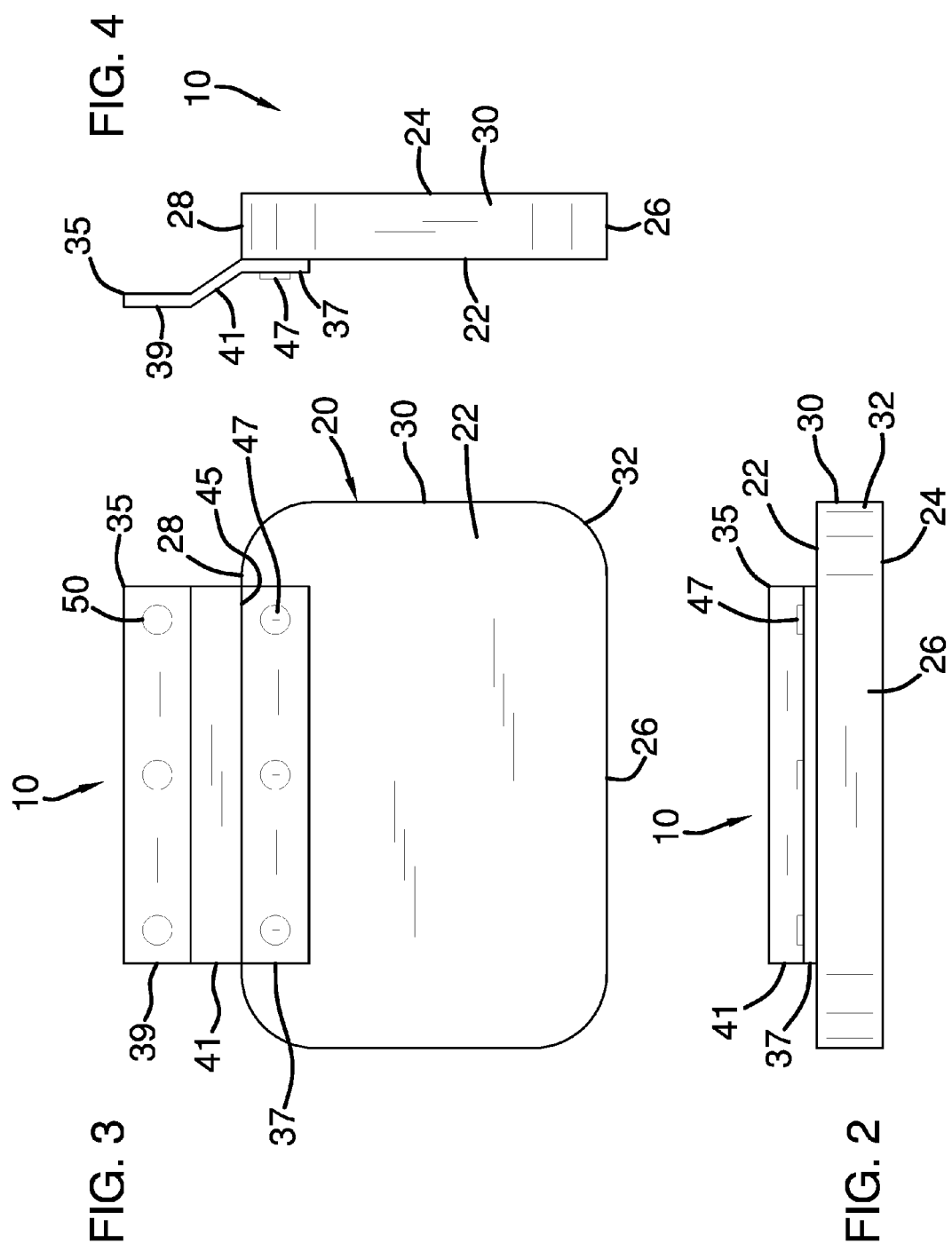

MAGNETIC VEHICLE TIRE PROTECTOR

BACKGROUND OF THE INVENTION

Various types of devices for protecting pneumatic tires are known in the prior art; however, these devices were subject to problems such as being mounted in a wrong location on the vehicle underside, such as between the front and rear wheels or behind the rear wheels, bulky and clumsy structures, and exposure of the device itself to road hazards What is needed, and what the present device provides, is a magnetic vehicle tire protector including a substantially parallelepiped magnetic body attached to a vehicle underside in front of each tire with a magnetic body bottom side having a width at least approximately equal to a width of a treaded surface of the tire. A substantially parallelepiped bracket, disposed on a top side of each magnetic body, has parallel internal and external sections and a parallelepiped center section therebetween at a 45-degree angle relative the internal section. The internal section is more proximal the top side than the internal section. The center and external sections extend outwardly from the internal section and the top side. Fasteners on the internal section permanently affix the bracket to the top side. Round apertures on the external section receive fastening elements to affix the respective bracket and magnetic body to the vehicle underside.

FIELD OF THE INVENTION

The present invention relates to devices for protecting pneumatic tires, and more particularly, to a magnetic vehicle tire protector which is devised to protect vehicle tires from road debris, such as pointed or sharp metallic objects, which can puncture a vehicle tire.

SUMMARY OF THE INVENTION

The general purpose of the present magnetic vehicle tire protector, described subsequently in greater detail, is to provide a magnetic vehicle tire protector which has many novel features that result in a magnetic vehicle tire protector which is not anticipated, rendered obvious, suggested, or even implied by prior art, either alone or in combination thereof. To accomplish this, the present magnetic vehicle tire protector devised to pick up magnetically attractable road hazard element, such as a nail, a screw, a metal scrap, a tack, and a bolt, from a ground surface proximal the respective tire. The instant device includes a plurality of substantially parallelepiped magnetic bodies, each of which has a top side, a bottom side having a width at least approximately equal to a width of a treaded surface of a vehicle tire, a front side, a rear side, a pair of side edges. Each of the plurality of magnetic bodies is configured to attach to an underside of a vehicle in a position directly in front of one of each of a tire of the vehicle in a position substantially parallel to the underside of the vehicle. Each of the plurality of magnetic bodies has a plurality of rounded corners, rather than sharp pointed edges which potentially create a road hazard and also could injure a user during installation.

A plurality of substantially parallelepiped brackets is also provided for attachment of the plurality of magnetic bodies. Each of the plurality of substantially parallelepiped brackets has a parallelepiped internal section, a parallelepiped external section, and a parallelepiped center section therebetween. The internal, external and center sections are disposed directly adjacent and parallel to each other and have a same length, width, and height. The internal section is centrally disposed on the top side of the magnetic body proximal the rear side. The internal section has a back edge directly adjacent to and aligned with the rear side of the magnetic body. The internal section is permanently affixed to the top side of the respective one of the plurality of substantially parallelepiped magnetic bodies. The internal section and the external section are parallel to each other and to the top side. The internal section is more proximal the top side than the external section. Each of the center section and the external section extend outwardly from the internal section and the top side, the center section disposed at approximately a 45-degree angle relative the internal section. The width of the internal section is at least greater than one-half a width of the top side for more secure attachment of the device to the vehicle underside. The configuration of each bracket promotes attachment to the vehicle underside while reducing a distance between the device and the ground surface to better pick up a magnetically attractable road hazard element in contrast to a bracket having coplanar internal, external, and center sections directly adjacent the underside of the vehicle which would present a greater distance between the magnetic body and the magnetically attractable road hazard element.

Spaced apart fasteners, disposed on the internal section, permanently affix the bracket to the top side of the magnetic body. Spaced apart round apertures, disposed on the external section of the respective one of the plurality of substantially parallelepiped brackets, have a diameter configured to receive a fastening element therethrough, which is provided to permanently affix the respective one of the plurality of substantially parallelepiped brackets and the respective one of the plurality of substantially parallelepiped magnetic bodies to the underside of the vehicle in a position directly in front of the respective tire. Each of the plurality of substantially parallelepiped magnetic bodies has a magnetic force configured to attract a metal object, such as a nail, from a ground surface proximal the respective tire.

Thus has been broadly outlined the more important features of the present magnetic vehicle tire protector so that the detailed description thereof that follows may be better understood and in order that the present contribution to the art may be better appreciated.

BRIEF DESCRIPTION OF THE DRAWINGS

Figures

FIG. 2 is a front elevation view.
FIG. 3 is a top plan view.
FIG. 4 is a side elevation view.

DETAILED DESCRIPTION OF THE DRAWINGS

Figure 1:
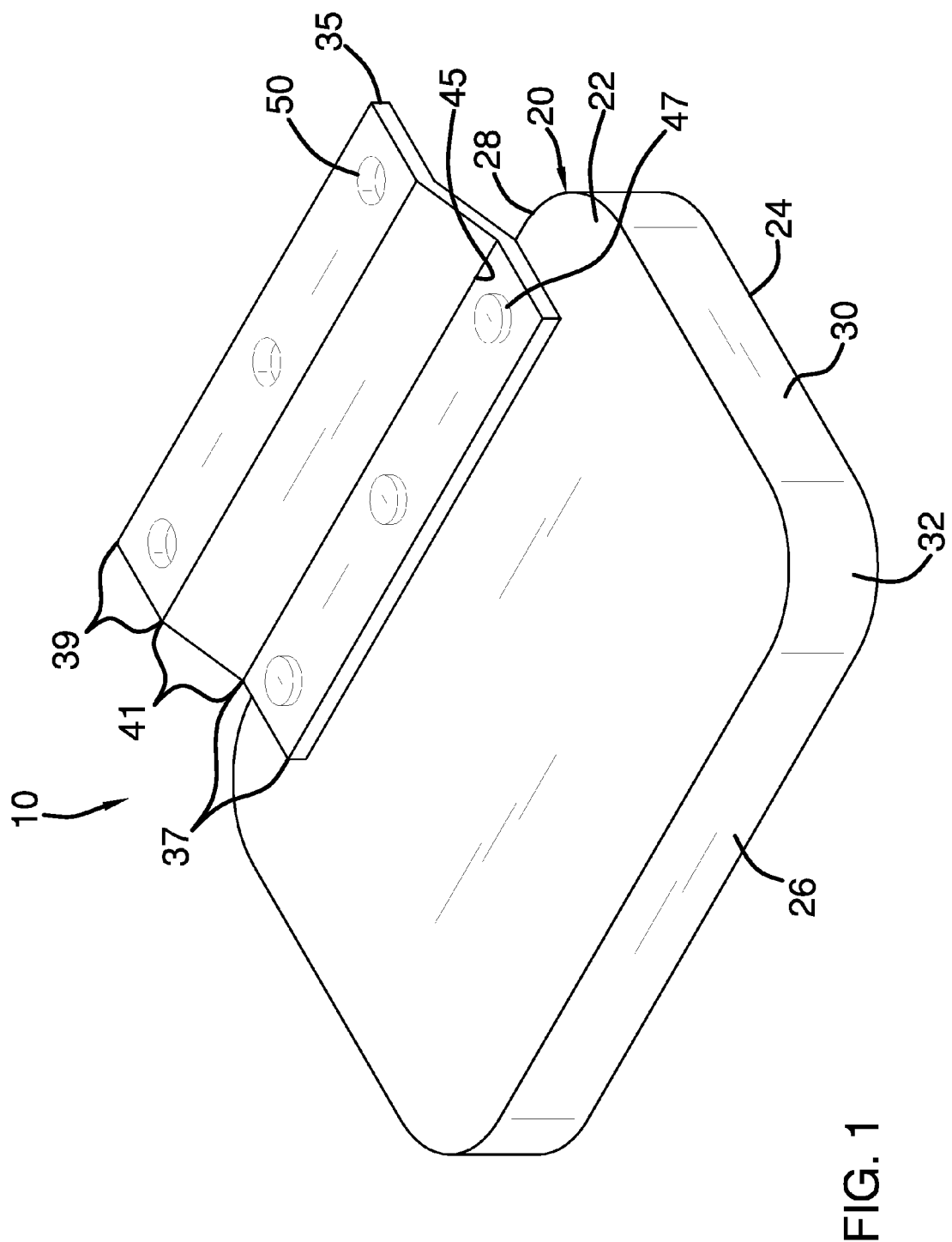
FIG. 1 is an isometric view.
Figure 5:
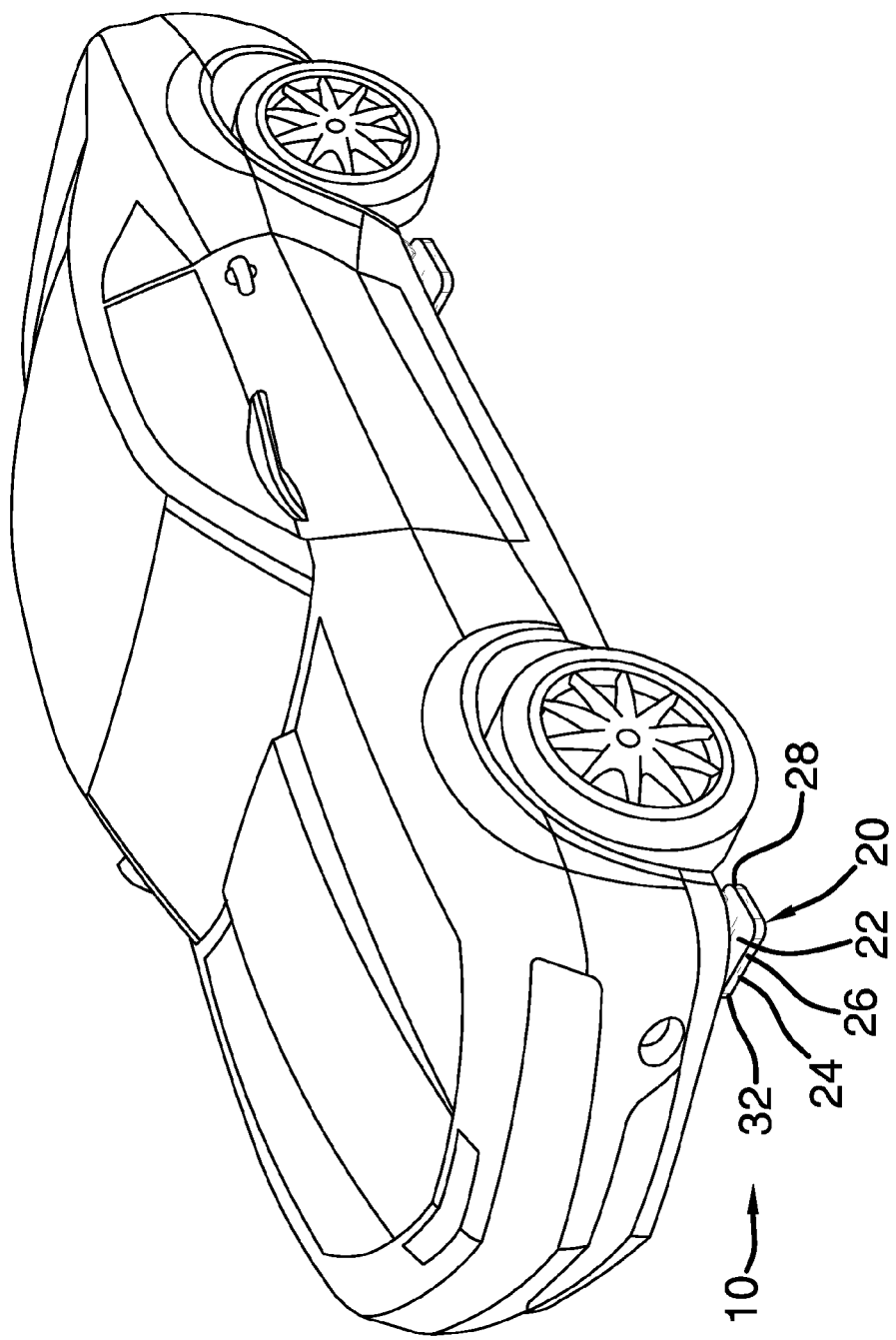
FIG. 5 is an in-use view.

With reference now to the drawings, and in particular FIGS. 1 through 5 thereof, an example of the instant magnetic vehicle tire protector employing the principles and concepts of the present magnetic vehicle tire protector and generally designated by the reference number 10 will be described.

Referring to FIGS. 1 through 5 the present magnetic vehicle tire protector 10 is illustrated. The magnetic vehicle tire protector 10 includes a plurality of substantially parallelepiped magnetic bodies 20. Each of the plurality of magnetic bodies 20 has a top side 22, a bottom side 24, a front side 26, a rear side 28, a pair of side edges 30. The bottom side 24 has a width at least approximately equal to a width of a treaded surface of a vehicle tire. Each of the plurality of magnetic bodies 20 is configured to attach to an underside of a vehicle in a position directly in front of one of each of tire of the vehicle in a position substantially parallel to the underside of the vehicle. Each of the plurality of magnetic bodies 20 has a plurality of rounded corners 32.

A plurality of substantially parallelepiped brackets 35 is provided. Each of the plurality of substantially parallelepiped brackets 35 is disposed on a respective one of the plurality of substantially parallelepiped magnetic bodies 20. Each of the plurality of substantially parallelepiped brackets 35 has a parallelepiped internal section 37, a parallelepiped external section 39, and a parallelepiped center section 41 therebetween. The internal, external and center sections 37, 39, 41 are disposed directly adjacent and parallel to each other and have a same length, width, and height. The internal section 37 is centrally disposed on the top side 22 of the respective one of the plurality of magnetic bodies 20 proximal the rear side 28. The internal section 37 has a back edge 45 directly adjacent to and aligned with the rear side 28 of the respective one of the plurality of magnetic bodies 20. The internal section 37 is permanently affixed to the top side 22 of the respective one of the plurality of substantially parallelepiped magnetic bodies 20. The internal section 37 and the external section 39 are parallel to each other and to the respective top side 22. The internal section 37 is more proximal the top side 22 than the external section 39. Each of the center section 41 and the external section 39 extend outwardly from the internal section 37 and the top side 22. The center section 41 is disposed at approximately a 45-degree angle relative the internal section 37. The width of the internal section 37 is at least greater than one-half a width of the top side 22.

A plurality of spaced apart fasteners 47 is disposed on the internal section 37. The plurality of spaced apart fasteners 47 is configured to permanently affix the respective bracket 35 to the top side 22 of the respective one of the plurality of magnetic bodies 20. A plurality of spaced apart round apertures 50 is disposed on the external section 39 of the respective one of the plurality of substantially parallelepiped brackets 35. Each of the round apertures 50 has a diameter configured to receive a fastening element therethrough, which is configured to permanently affix the respective one of the plurality of substantially parallelepiped brackets 35 and the respective one of the plurality of substantially parallelepiped magnetic bodies 20 to the underside of the vehicle in a position directly in front of the respective tire. Each of the plurality of substantially parallelepiped magnetic bodies 20 has a magnetic force configured to attract a magnetically attractable road hazard element, such as a nail, a screw, a metal scrap, a tack, and a bolt, from a ground surface proximal the respective tire.

What is claimed is:

1. A magnetic vehicle tire protector comprising:
a plurality of substantially parallelepiped magnetic bodies, each of the plurality of magnetic bodies having a top side, a bottom side, a front side, a rear side, a pair of side edges, wherein the bottom side has a width at least approximately equal to a width of a treaded surface of a vehicle tire, wherein each of the plurality of magnetic bodies is configured to attach to an underside of a vehicle in a position directly in front of one of each of a tire of the vehicle in a position substantially parallel to the underside of the vehicle;

a plurality of substantially parallelepiped brackets, each of the plurality of substantially parallelepiped brackets having a parallelepiped internal section, a parallelepiped external section, and a parallelepiped center section therebetween, the internal, external and center sections being disposed directly adjacent and parallel to each other and having a same length, width, and height, wherein the internal section is centrally disposed on the top side of the respective one of the plurality of magnetic bodies proximal the rear side, the internal section having a back edge directly adjacent to and aligned with the rear side of the respective one of the plurality of magnetic bodies, the internal section being permanently affixed to the top side of the respective one of the plurality of magnetic bodies, wherein the internal section and the external section are parallel to each other and to the respective top side, wherein the internal section is more proximal the respective top side than the internal section, wherein each of the center section and the external section extend outwardly from the internal section and the respective top side, the center section disposed at approximately a 45-degree angle relative the internal section;

a plurality of spaced apart fasteners disposed on the internal section, wherein the plurality of fasteners is configured to permanently affix the respective one of the plurality of substantially parallelepiped brackets to the top side of the respective one of the plurality of substantially parallelepiped magnetic bodies; and a plurality of spaced apart round apertures disposed on the external section of the respective one of the plurality of substantially parallelepiped brackets, wherein each of the round apertures has a diameter configured to receive a fastening element therethrough, wherein the fastening element is configured to permanently affix the respective one of the plurality of substantially parallelepiped brackets and the respective one of the plurality of magnetic bodies to the underside of the vehicle in a position directly in front of the respective tire;

wherein each of the plurality of substantially parallelepiped magnetic bodies has a magnetic force configured to attract a magnetically attractable road hazard element from a ground surface proximal the respective tire.

2. The magnetic vehicle tire protector of claim 1 wherein each of the plurality of magnetic bodies has a plurality of rounded corners.

3. A magnetic vehicle tire protector comprising:
a plurality of substantially parallelepiped magnetic bodies, each of the plurality of magnetic bodies having a top side, a bottom side, a front side, a rear side, a pair of side edges, wherein the bottom side has a width at least approximately equal to a width of a treaded surface of a vehicle tire, wherein each of the plurality of magnetic bodies is configured to attach to an underside of a vehicle in a position directly in front of one of each of a tire of the vehicle in a position substantially parallel to the underside of the vehicle, wherein each of the plurality of magnetic bodies has a plurality of rounded corners;

a plurality of substantially parallelepiped brackets, each of the plurality of substantially parallelepiped brackets being disposed on a respective one of the plurality of substantially parallelepiped magnetic bodies, each of the plurality of substantially parallelepiped brackets having a parallelepiped internal section, a parallelepiped external section, and a parallelepiped center section therebetween, the internal, external and center sections being disposed directly adjacent and parallel to each other and having a same length, width, and height wherein the internal section is centrally disposed on the top side of the magnetic body proximal the rear side, the internal section having a back edge directly adjacent to and aligned with the rear side of the magnetic body, the internal section being permanently affixed to the top side of the respective one of the plurality of substantially parallelepiped magnetic bodies, wherein the internal section and the external section are parallel to each other and to the top side, wherein the internal section is more proximal the respective top side than the internal section, wherein each of the center section and the external section extend outwardly from the internal section and the top side, the center section disposed at approximately a 45-degree angle relative the internal section, wherein the width of the internal section is at least greater than one-half a width of the top side;

a plurality of spaced apart fasteners disposed on the internal section, wherein the fasteners are configured to permanently affix the bracket to the top side of the magnetic body; and a plurality of spaced apart round apertures disposed on the external section of the respective one of the plurality of substantially parallelepiped brackets, wherein each of the round apertures has a diameter configured to receive a fastening element therethrough, wherein the fastening element is configured to permanently affix the respective one of the plurality of substantially parallelepiped brackets and the respective one of the plurality of substantially parallelepiped magnetic bodies to the underside of the vehicle in a position directly in front of the respective tire;

wherein each of the plurality of substantially parallelepiped magnetic bodies has a magnetic force configured to attract a magnetically attractable road hazard element from a ground surface proximal the respective tire.

\* \* \* \* \*